United States Patent [19]

Muggli et al.

[11] Patent Number: 5,193,265
[45] Date of Patent: Mar. 16, 1993

[54] METHOD OF PRODUCING A CUP-SHAPED, STERILIZABLE CONTAINER

[75] Inventors: Olivier Y. Muggli, Neuhausen am Rheinfall; Andreas Ziegler, Schaffhausen, both of Switzerland

[73] Assignee: Alusuisse-Lonza Services Ltd., Zurich, Switzerland

[21] Appl. No.: 686,693

[22] Filed: Apr. 17, 1991

[30] Foreign Application Priority Data

Apr. 26, 1990 [CH] Switzerland ............................ 1437/90

[51] Int. Cl.$^5$ ................................................ B21B 1/46
[52] U.S. Cl. ........................................ 29/527.4; 156/69; 156/212; 156/224; 156/229; 206/538
[58] Field of Search .................. 156/212, 69, 224, 229; 29/527.4; 206/538

[56] References Cited

U.S. PATENT DOCUMENTS

| | | |
|---|---|---|
| 3,349,153 | 10/1967 | Beck . |
| 3,444,022 | 5/1969 | Bichsel . |
| 3,654,012 | 4/1972 | Schlager ............................ 156/212 |
| 3,894,896 | 7/1975 | Watanabe ......................... 156/212 X |
| 4,559,257 | 12/1985 | Nilsson ............................. 156/212 X |
| 5,087,311 | 2/1992 | Elliott et al. ......................... 156/212 |

FOREIGN PATENT DOCUMENTS

| | | |
|---|---|---|
| 0140282 | 5/1985 | European Pat. Off. . |
| 0307833 | 3/1989 | European Pat. Off. . |
| 2321980 | 4/1974 | Fed. Rep. of Germany . |
| 2105038 | 4/1972 | France . |
| 2201671 | 4/1974 | France . |
| 2396601 | 2/1979 | France . |
| 2549749 | 2/1985 | France . |
| 2600936 | 1/1988 | France . |
| 2640545 | 6/1990 | France . |

*Primary Examiner*—Carl J. Arbes
*Attorney, Agent, or Firm*—Bachman & LaPointe

[57] ABSTRACT

A method of producing a cup-shaped sterilizable container from a stretch-drawable composite laminate of a total wall thickness between 30 and 200 μm with an aluminum foil of a thickness less than 40 μm, a sealable plastic inner layer of high extensibility and a plastic outer layer of high extensibility and load-bearing capacity, the side wall of the container running at a side wall angle (a) with respect to the direction perpendicular to the container bottom, is distinguished in that the composite laminate is deep drawn free from folds at a side wall angle of 30° using smooth-walled forming tools then combined deep/stretch drawn and subsequently stretch drawn.

9 Claims, 4 Drawing Sheets

METHOD OF PRODUCING A CUP-SHAPED, STERILIZABLE CONTAINER

BACKGROUND OF THE INVENTION

The invention relates to a method of producing a cup-shaped, sterilizable container from a stretch-drawable composite laminate of a total wall thickness between 30 and 200 $\mu$m with an aluminum foil of a thickness less than 40 $\mu$m, a sealable plastic inner layer of high extensibility and a plastic outer layer of high extensibility and load-bearing capacity, the side wall of the container running at a side wall angle with respect to the direction perpendicular to the container bottom, as well as such a container and the use of such containers.

A method of producing a cup-shaped container is known in which a composite laminate of at least one metal foil of a thickness of not more than 40 $\mu$m and a synthetic resin film is produced by shaping from the flat laminate, with fold forming in the side wall. The fold forming is effected by a corresponding grooving of the forming tool, such as a die. The folds are intended to avoid the forming of cracks or pores even in the case of use of thin metal foils of a wall thickness of less than 40 $\mu$m and thus ensure desired tightness requirements for long-term preserving (EP 0 140 282 A2). However, precisely at the folding points, the forming of pores or cracks cannot be ruled out with certainty. Apart from this, the appearance of the container provided with folds in the side wall is unsatisfactory. Finally, a high material expenditure is required for forming the folds.

It is therefore the object of the invention to provide a method of the type described above with which a container can be produced free from folds, the perfect barrier property, for example gas tightness in both directions, required for long-term preserving characteristics being ensured with a small wall thickness of the aluminum foil.

SUMMARY OF THE INVENTION

The foregoing object is achieved according to the invention by a method that the composite laminate is drawn free from folds at a side wall angle (a) of essentially $\leq 30°$, in particular $\leq 15°$, using smooth-walled forming tools.

As is known, the difference between a deep drawing and a stretch drawing is that in the case of deep drawing the material can continue flowing into the forming tool, whereas in the case of stretch drawing it is held clamped at the edge, so that the wall thickness is reduced on account of an extension.

In both of the configurations discussed above, the method according to the invention is based on the surprising and hitherto unpracticed idea of subjecting a stretch-drawable composite laminate fully or at least partially to a deep drawing. Astonishingly, a deep-drawable composite laminate can be excellently deep drawn or deep and stretch drawn without fold forming. The high extensibility of the stretch-drawing laminate used makes it possible to achieve very high degrees of extension with perfect barrier properties, to be precise even in the case of wall thicknesses of the aluminum foil down to for example 8 $\mu$m. A person skilled in the art could not have expected such good deep-drawing properties on account of the comparatively high proportion of plastic in the composite laminate. Thus, until now, stretch-drawable composite laminates have not been processed by deep drawing.

The method according to the invention succeeds in achieving, free from pores and free from folds, degrees of forming of radially over 20% and tangentially about 10%, whereas usual deep-drawing material of a thickness of 80 to 100 $\mu$m as a rule only withstands maximum dimensional changes between 2 and 8% during deep drawing.

Preferably both the deep drawing, the combined deep-stretch drawing and the stretch drawing in the case of a method according to the invention takes place without lubrication; for the lubrication has disadvantages regarding the adhesion between the composite laminate and a plastic molded thereupon to increase the rigidity as well as with regard to lubricant residues which remain in the finished container and would require an elaborate cleaning before filling.

According to the findings of the inventor, a die for carrying out the drawing method according to the invention, and in particular the part of the die which is in contact with the composite laminate, is to consist advantageously of a material of high surface slip, mechanical stability and abrasion resistance. Since the forming forces of the stretch-drawing laminates used are comparatively small, apart from metal, synthetic materials can also be used, such as for example silicone rubbers, such as polytetrafluoroethylene or polymethylpentene, as preferred die materials and in particular coatings over the die part which is in contact with the composite laminates.

In the case of deep drawing, deep-stretch drawing, and stretch drawing, both a rigid die and a radially expandable die can be used. Whereas deep drawing, deep-stretch drawing and stretch drawing takes place simultaneously with controlled hold-down force, it is possible for example to carry out initially a deep-drawing step for deep drawing and a deep-drawing and stretch-drawing step of the composite laminate to the final depth of the finished container without radial expansion of the die and subsequently a stretch-drawing step under radial expansion of the die to the width of the finished container. In this case, the die preferably consists of a flexible, elastomeric material, such as a silicone material, which expands radially under axial compressive loading.

To achieve the required rigidity and buckling strength, it is possible in a further method step to mould a further, reinforcing plastic layer onto the outside of the container.

A container according to the invention advantageously consists of a composite laminate with an aluminum-foil of a thickness of between 8 and 40 $\mu$m between a plastic inner layer of a thickness between 30 and 80 $\mu$m and a plastic outer layer of a thickness between 1 and 40 $\mu$m, the container walling being fold-free.

Preferred materials for the various layers of the composite laminate are polyolefins, polyesters, polyethylene terephthalates, polyvinyl chloride, polystyrenes, polyamides or copolymers. Among the examples of materials which are most particularly preferred are polystyrene, polypropylene, polyethylene, polyamide PA 6, PA 66 or PA 12.

Suitable as layers of the composite laminate are, for example, uniaxially or biaxially oriented plastic films, for example as mentioned above and preferably of polypropylene, polyethylene and polyamide. Among the films, the biaxially oriented films are in turn particularly suitable.

In practice, use is made above all of laminates which are made up of biaxially oriented films of polypropylene, polyethylene or polyamides, the films expediently having at an application thickness of 10 to 40 μm, under 10 to 15% extension, stress values of 70 to 80 MPa and essentially rising linearly, for example under 40% extension, stress values of 150 to 250 MPa.

Particularly suitable are, for example, laminates which are made up of inner and/or outer films of biaxially oriented polypropylene in a thickness of 30 to 40 μm, which have, under an extension of 15%, stress values between 70 and 80 MPa and under an extension of 40%, stress values of 230 to 250 MPa, or of biaxially oriented polyethylene in a thickness of 17 to 23 μm, which has, under an extension of 15%, stress values between 70 and 80 MPa and under an extension of 40%, stress values of 140 to 160 MPa, and/or polyamide in a thickness of 12 to 17 μm, which has, under an extension of 15%, stress values between 70 and 80 MPa and, under an extension of 40%, stress values of 120 to 150 MPa.

In practice, an expedient upper limit value for the side wall angle between the side wall and the perpendicular with respect to the container bottom is about 30°, the lower limit value is formed by the perpendicular, corresponding to 0°.

The reinforcing, molded-on plastic outer layer advantageously has a thickness between 0.1 and 0.6 mm and is designed in such a way that, in the event of denting in use, the material springs back into its original position again of its own accord ("spring-back" properties).

On the finished container there is formed a peripheral, closed edge zone, which, surrounding the container opening, faces upwards with the sealable plastic inner layer. After filling, a sealing layer of any known design is heat-sealed onto this edge zone, which is possible without tightness problems on account of the freedom from folds of the container.

BRIEF DESCRIPTION OF THE DRAWINGS

The invention is explained more closely in further details below by exemplary embodiments with reference to schematic drawings, in which.

DETAILED DESCRIPTION

Figure 1:
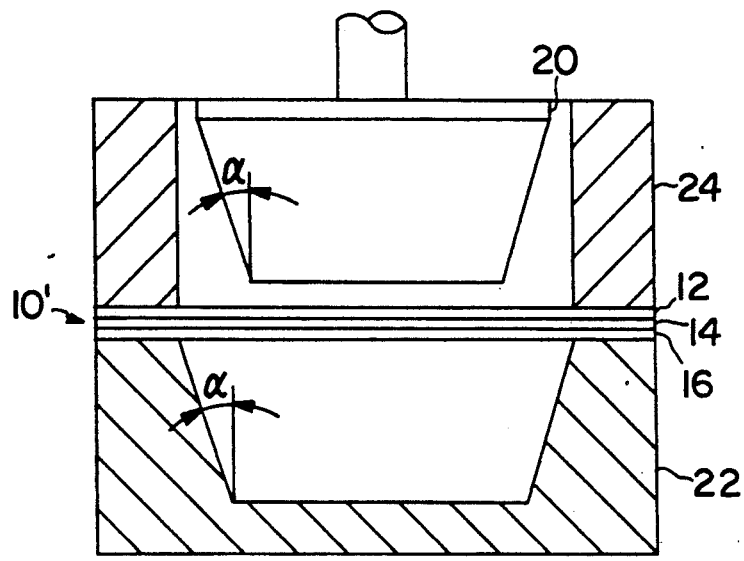
FIGS. 1 to 3 show three method stages when producing a container according to the invention from a composite laminate by deep drawing, combined deep and stretch drawing and stretch drawing by means of a rigid die.

The present invention also comprises a method of producing a cup-shaped container (10) from a stretch-drawable composite laminate (10') of a total wall thickness between 30 and 200 μm with an aluminum foil (14) of a thickness less than 40 μm, a sealable plastic inner layer (12) of high extensibility and a plastic outer layer (16) of high extensibility and load-bearing capacity, the side wall (17) of the container (10) running at a side wall angle (a) with respect to the direction perpendicular to the container bottom, which method is characterized in that the composite material (10') is combined deep and stretch drawn free from folds at a side wall angle (a) of essentially 30° using smooth-walled forming tools (20, 30, 22).

In an expedient embodiment, the method described is characterized in that, at a side wall angle in a range of 15° to 30°, the combined deep drawing and stretch drawing takes place by means of a die, the composite material (10') being deep drawn in a deep-drawing step to 30–70% of the depth (H) of the finished container and drawn in a following deep-drawing/stretch-drawing step to 75–95% of the depth (H) of the finished container and brought to the depth and width of the finished container (10) in a stretch-drawing step following thereafter.

It is particularly expedient in the case of the method described that the combined deep drawing and stretch drawing takes place by means of a radially expandable die and, during and/or after the stretch-drawing step under radial expansion of the die (30), the composite material (10') is brought to the depth (H) and width of the finished container.

In the case of the method described, the die (30) preferably consists, on the sides effective in deformation, of a flexible, elastomeric material which expands radially under axial compressive loading.

In a further embodiment of the method, as described, the deep drawing, the deep-stretch drawing and the stretch drawing takes place one after the other with controlled holding-down force of the hold-down plate. In the case of this method, it is preferred that the deep-drawing step takes place with a holding-down force of the hold-down plate such that the laminate material required for the deep-drawing step is drawn after out of the region of the mold and of the hold-down plate, that the deep-drawing/stretch-drawing step takes place with a holding-down force of the hold-down plate such that the laminate material required is then only partially drawn after and simultaneously stretched and that the stretch-drawing step takes place with a holding-down force of the hold-down plate such that no laminate material is drawn after out of the region of the mold and of the hold-down plate, and that the material in the region between mold and die is stretched.

The deep-drawing/stretch-drawing step can be understood as meaning that the material necessary for shaping the container to be produced, between forming tool and die, is then only partially drawn after and the respective container depth is reached by simultaneous stretching of the already drawn-after material.

In practice, the process is performed, for example, by arranging that the deep-drawing step (phase $I_n$ at a holding-down force of the hold-down plate of 0.8 to 2 kN and/or at a specific holding-down force of 10 to 47 N/cm², which begins at 0% of the container depth (H), which also corresponds to the die travel, and ends at 40 to 60% of the container depth (H). The deep-drawing/stretch-drawing step (phase $II_n$) follows, the holding-force of the hold-down plate being increased to 1 to 2.3 kN and/or to a specific holding-force of 20 to 50 N/cm$^2$, until 75 to 90% of the container depth (H) has been reached. Subsequently the stretch-drawing step (phase $III_n$) takes place at a holding-down force of the hold-down plate of over 30 kN and in particular 40 to 60 kN and/or to a specific holding-down force of over 50 N/cm$^2$ and preferred of 52 to 1000 N/cm$^2$, until 100% of the container depth (H).

Figure 7:
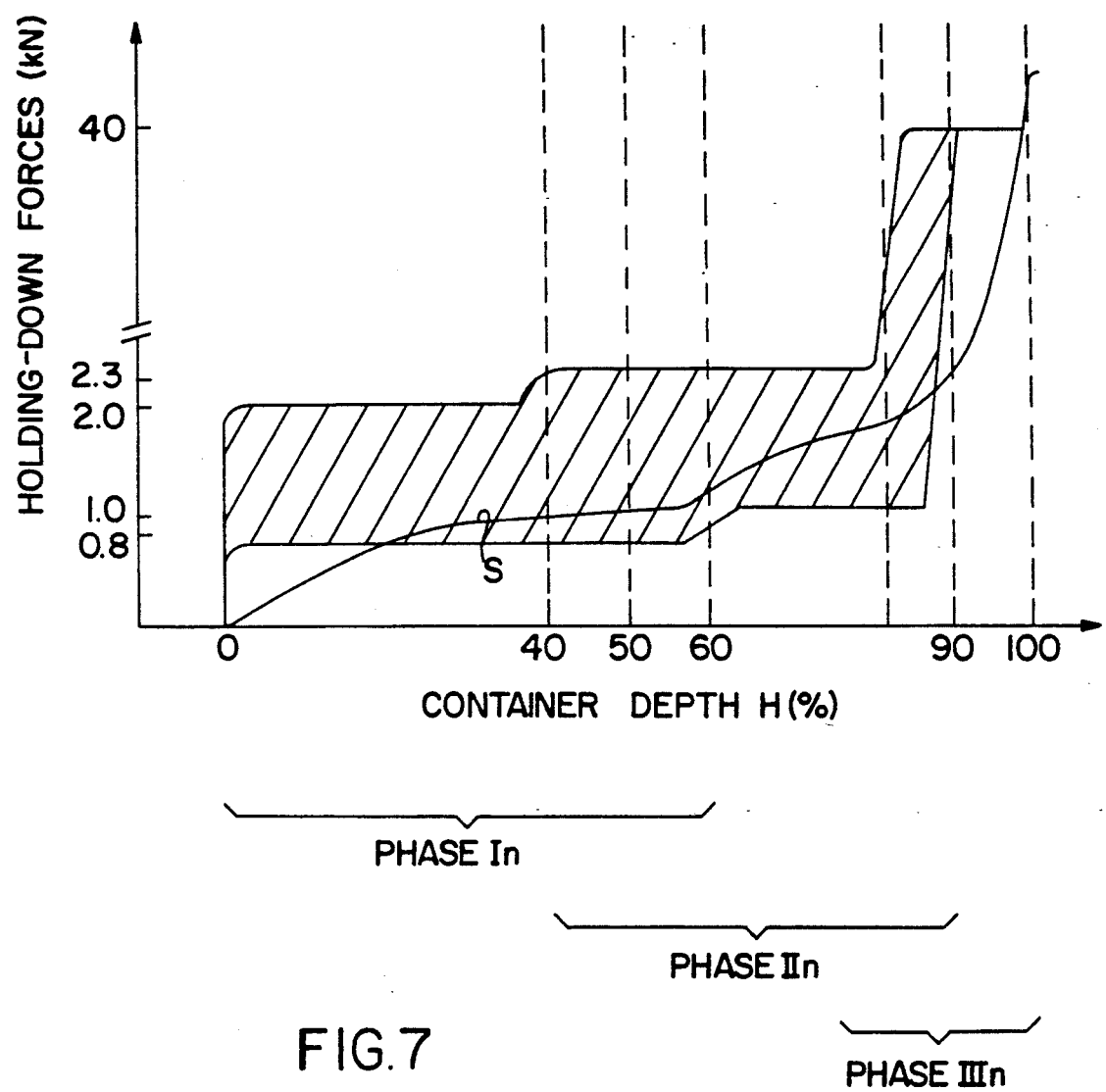
FIG. 7 shows a diagram with the forces over time acting on the die and the hold-down plate during the production according to FIGS. 1 to 6.

In FIG. 7, the steps of the holding-down forces with respect to the container depth are illustrated. The container depth, represented by the abscissa is divided into the phases $I_n$, $II_n$ and $III_n$, the ordinate reproduces the holding-down forces.

The shaded region describes by way of example the optimum conduction of the process. In the phase $I_n$, beginning at 0% to about 40 to 60% of the container depth, the holding-down force is kept constant at 0.8 to 2.0 kN and/or at a specific holding-down force from 10 to 47 N/cm$^2$. In this region, the laminate can easily slip after through the gap between hold-down plate and mold.

In phase $II_n$, which follows for example from 40 to 90% of the container depth, the holding-down force is increased, values from 1.0 kN to 2.3 kN and/or specific holding-down forces from 20 to 50 N/cm$^2$ being expedient. In this phase, the laminate is held more strongly between mold and hold-down plate, the laminate already being slightly stretched but also still able to slip after to a limited extent.

In the phase $III_n$, which begins for example at 75% to 90% container depth (H) and extends to 100% of the container depth, the holding-down force is increased to such an extent for example to specific holding-down forces of over 50 N/cm$^2$ and preferred of 52 to 1000 N/cm$^2$ that the laminate is held firmly between hold-down plate and mold and no slipping-after is possible any longer. As a result, the material already in the mold is extended or stretched.

If the die is designed for example as an elastomeric die, under the pressure of the concavely designed die underside, the laminate already reaches the mold bottom at the beginning of the phase III and, under increasing pressure, the laminate begins to extend out radially.

Examples of typical films which can be processed in such a way according to the invention the layers have 35 μm oPP/20 μm Al/35 μm oPP or 35 μm oPP 35 μm Al/40 μm PP (oPP=biaxially oriented polypropylene, PP non-oriented polypropylene).

In the case of the present process, the deep drawing, the deep-stretch drawing and the stretch drawing expediently takes place without lubrication.

Figure 2:
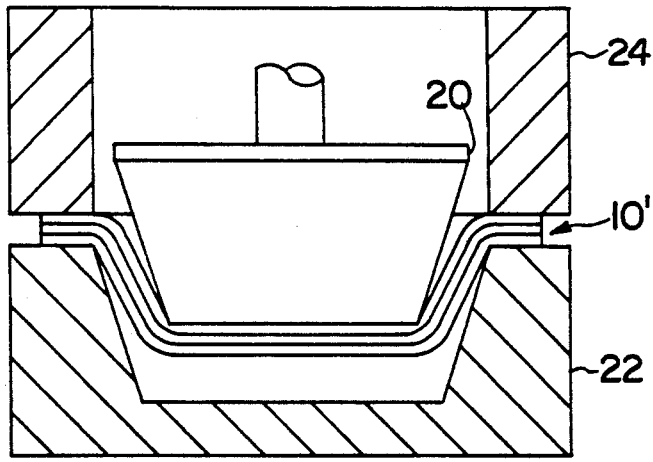
Figure 3:
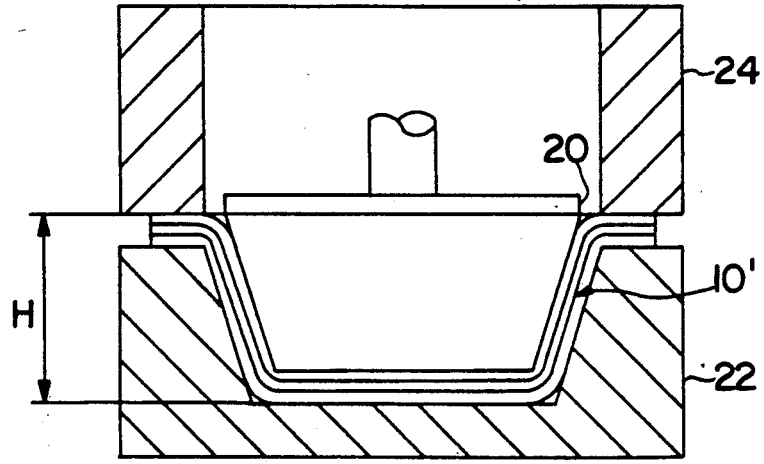

Now, with reference to FIGS. 1 to 3, a process is described in which a stretch-drawable composite laminate 10' is formed from an aluminum foil 14 of a thickness less than 40 μm, a sealable plastic inner layer 12 of high extensibility and a plastic outer layer 16 of high extensibility and load-bearing capacity in a forming tool with a die 20, a mold 22 and a hold-down plate 24, starting from the state as shown in FIG. 1. The die 20 in this case consists of a rigid material and in particular the surfaces of the die coming into contact with the composite laminate of, for example, polytetrafluoroethylene (PTFE), polymethylpentene (PMP) or of metal, such as steel. These materials have proved to have adequate surface slip and to be adequately mechanically stable and resistant to abrasion during fold-free deep drawing without lubrication, provided that the side wall angle a is steep, i.e. for example 30°.

In the process step according to FIG. 2 the rigid die 20 has already covered part of its path downwards. The composite laminate 10' in this case flows after through the drawing gap between the hold-down plate 24 and the mold 22 in a controlled manner. The holding-down force is in this case kept constant at a low value in the phase In (cf. FIG. 7).

Figure 8:
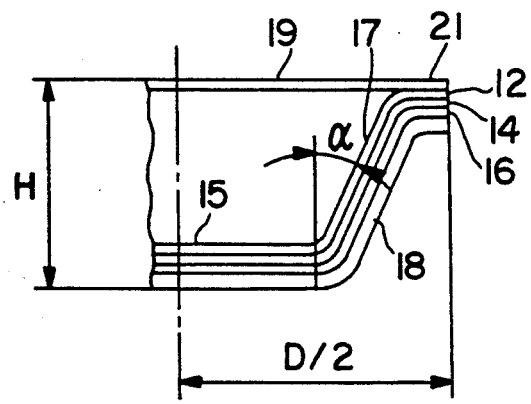
FIG. 8 shows a partial cross-section through a finished container according to the invention.
Figure 9:
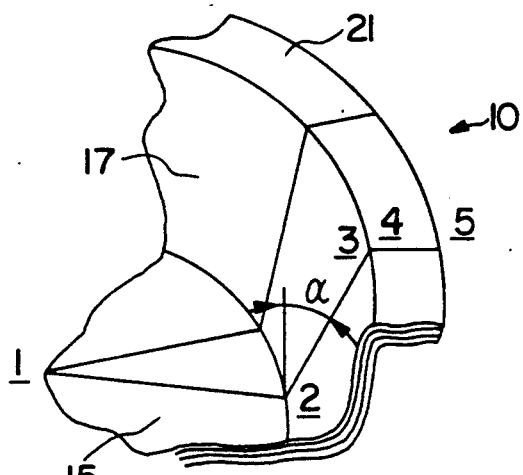
FIG. 9 shows a cutout of the finished container after combined deep/stretch drawing with an elastomeric die in a perspective partial view.

FIG. 3 shows a state in which the die 20 has reached the end position of its downward travel. In this position, the material has been drawn to the final depth H of the container (FIG. 8). The holding-down force is hereby increased according to phase IIIn in FIG. 7. The annular edge of the container, denoted by 21 in FIG. 8 and FIG. 9, is thereby smoothed out, so that an even surface for a subsequent sealing is attained. At the same time, the container is shaped into the final form.

Figure 4:
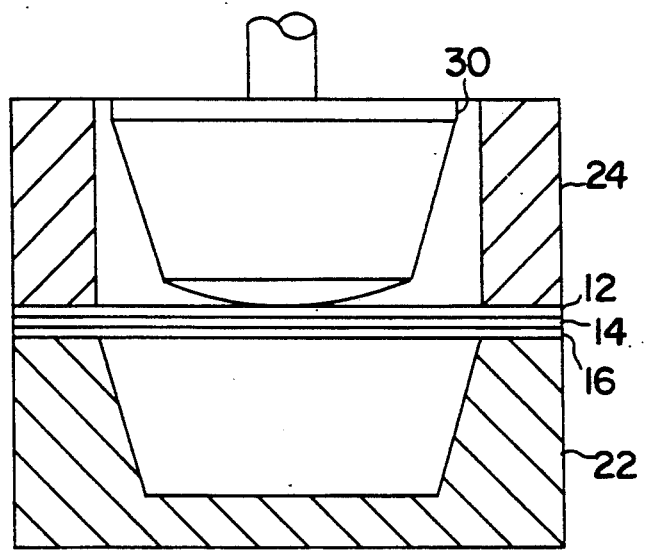
FIGS. 4 to 6 show three method stages when producing a container according to the invention from a composite laminate by means of a flexible die of an elastomeric material.
Figure 5:
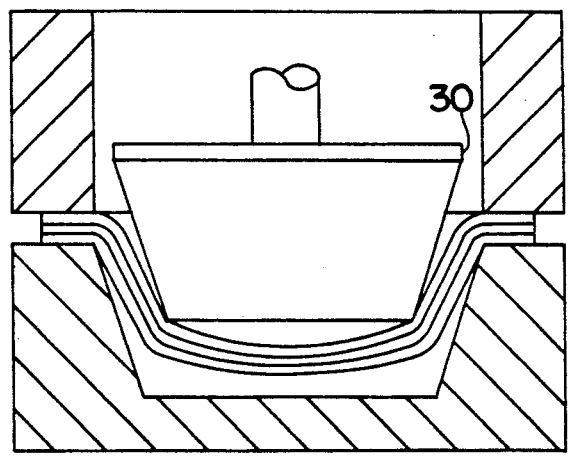
Figure 6:
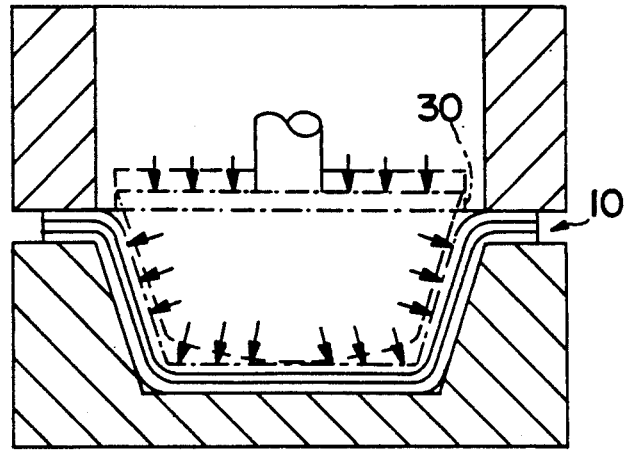

In the case of the process described with reference to FIGS. 1 to 3, a deep drawing and a stretch drawing takes place in phase IIn at one and the same time, but also already in phase In, i.e. in the intermediate stage of production between the process stages according to FIG. 1 and FIG. 3 the composite laminate is held firmly at the edge with a constant, even though small holding-down force. This also applies in the case of working with an elastomeric die 30 of a silicone material. In FIG. 4, the initial state corresponding to FIG. 1 is represented. In FIG. 5, an intermediate state with partially lowered die 30 is shown. In FIG. 7, a curve "S" is drawn in by way of example, the ordinate expressing the die force of the elastomeric die 30. The die force increases here in phase In and IIn relatively evenly with a gradual rise, then to increase steeply in phase IIIn. This rise begins at the instant at which the die 30 has reached the broken-line position in FIG. 6, it having just drawn the composite laminate against the mold bottom with its center. Upon further lowering of the die, the said die expands radially such that it presses the composite laminate in the way indicated by the arrows on all sides against the mold walling with increasing pressing force according to phase IIIn of the curve "S" in FIG. 7. Thus, with increasing axial pressure loading, the die 30 is expanded radially in the way indicated by the arrows into an end state represented by dot-dashed lines.

FIG. 8 shows a half-section through the finished container, there also being shown a plastic layer 18 molded onto the outside in order to achieve the desired rigidity or buckling strength of the container.

Figure 10:
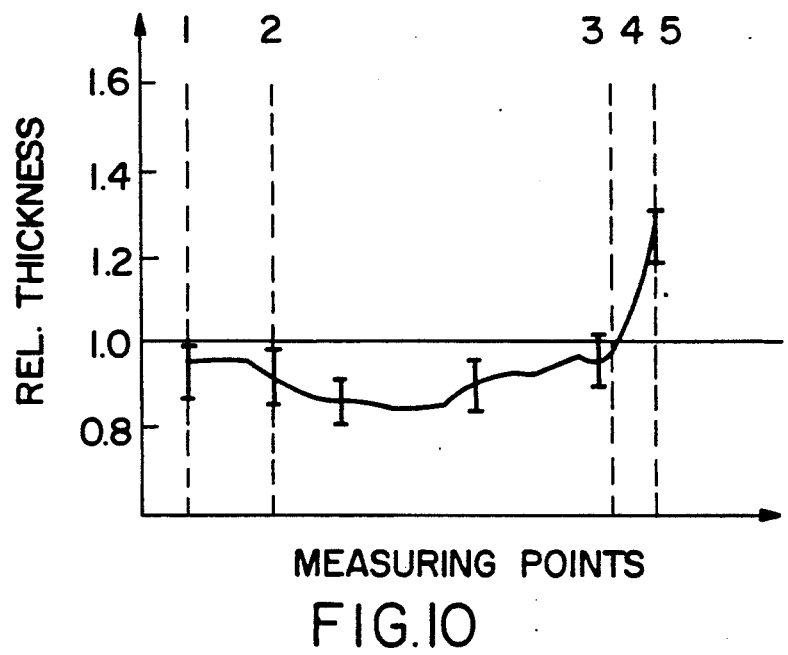
FIG. 10 shows a diagram with the relative thickness of the container at various measuring points, the figures assigned to the dashed lines belonging to the locations in FIG. 9 denoted by the same figures.

The thickness profile measured according to FIG. 10 in the case of combined deep/stretch drawing lies between that of a straightforward stretch drawing (constant increase in thickness from the bottom to the edge region with the end value 1) and the measured, depicted thickness curve in the case of deep drawing From the bottom region to the edge region (between the points 1 and 5), the thickness is below the initial thickness. This means that the material has been stretched, so that no folds have formed.

The present invention also relates to a cup-shaped, sterilizable container of a stretch-drawable composite laminate (10') with an aluminum foil (14) of a thickness less than 40 μm, a sealable plastic inner layer (12) of high extensibility and a plastic outer layer (16) of high extensibility and load-bearing capacity, the side wall of the container running at a side wall angle (a) with respect to the direction perpendicular to the container bottom, wherein the aluminum foil (14) has a thickness between 8 and 40 $\mu$m, wherein the plastic inner layer (12) has a thickness between 30 and 80 $\mu$m, wherein the plastic outer layer (16) has a thickness between 1 and 40 $\mu$m and wherein the container walling is fold-free.

In the following, the structure of the container is explained in further detail, as represented by way of example in FIG. 8, to be precise from inside to outside. The plastic inner layer 12 faces towards the product with which the container is to be filled, for example towards a food product. It therefore has a corrosion protection function. In addition, the plastic inner layer 12 also serves to support the aluminum foil 14, protecting the latter against corrosive filling products. Finally, the plastic inner layer serves as a sealing layer for sealing on a lid film 19. Just like the plastic outer layer 16, the plastic inner layer 12 may be laminated or varnished onto the aluminum foil. Opaque, i.e. pigmented, films or films colored with dyes may be used. Alternatively, a laminating adhesive or varnish colored with pigments, for example TiO$_2$, or dyes may be used. The thickness of the plastic inner layer 12 lies in a range between 30 and 70 $\mu$m. In view of the sealability and sterilizability demanded, polypropylene (PP), polyethylene (PE) and polystyrene (PS), polyamides PA 6, PA 66 or PA 12 or their copolymers are expediently used as materials.

The aluminum foil 14 serves as a gastight barrier layer. On account of its absolute impermeability, in particular with respect to oxygen and also other gases, water vapor and flavorings, it ensures long-term preserving characteristics (for example longer than 1 year) of the sterilized products packed in the container. The thickness of the aluminum foil 14 is in practice distinctly below 40 $\mu$m, preferably in the range between 8 and 25 $\mu$m. The aluminum foil 14 advantageously consists of aluminum having an Al content of 98.6% and more or of an aluminum alloy, for example of the alloy 8102, which is particularly fine-grained and is used with advantage in the case of stretch-drawable composite laminates.

The plastic outer layer 16 serves as an adhesion promoter between the formed composite laminate and the molded-on plastic layer 18 as well as an extension promoter during the described forming according to the invention. The thickness of the plastic outer layer 16 may be between 1 and 40 $\mu$m. The plastic outer layer 16 may be varnish-laminated or extrusion-laminated as a film onto the aluminum foil 14. The layer 16 must be able to absorb the forces and extensions of the aluminum foil 14 occurring during forming. Depending on the plastic molded around, the plastic outer layer 16 consists for example of oriented polyethylene (oPE), oriented polypropylene (oPP), oriented polyester or oriented polyamide or of the copolymers of the said plastics. In the case of such copolymers, the lower load-bearing capacity in comparison with stretched films is to be compensated by increased thickness (20 to 40 $\mu$m). Thanks to the supporting effect of the plastic outer layer 16 on the aluminum foil 14, the high extensions (FIG. 10) of more than 20% can be achieved without pores in the aluminum layer 14.

The varnish-laminated or extrusion-laminated plastic outer layer 16 may also be formed by highly extensible varnishes of polyurethane-polyvinyl, polyester or epoxy resins.

Preferred containers, as described above, are characterized in that the composite laminate (10') has a layer structure (from outside to inside) with 12 to 20 $\mu$m polyethyleneterephthalate/8 to 25 $\mu$m aluminum/50 to 75 $\mu$m polyethylene.

Furthermore, containers are preferred which, according to the present invention, externally a further reinforcing plastic layer (18) of a thickness between 0.1 to 0.6 mm is molded onto the outside of the container (10).

The further reinforcing plastic layer (18) may, for example, consist of polypropylene, polyethylene or their copolymers, polyethyleneterephthalate, polyamide, recycled plastics, acryl-butadiene-styrene, polycarbonate or foamed plastics, such as foamed polypropylene, polyethylene, polystyrene or polyurethane, or contain these plastics.

Preferred containers according to the present invention are closed by means of a sealing layer (19), which is heat-sealed onto the sealable plastic inner layer (12) in a peripheral, closed edge zone (21).

On account of its structure with a comparatively low proportion of aluminum and high proportion of plastic, the aluminum-plastic composite laminate described represents a stretch-drawable laminate. In spite of the relatively thin aluminum foil, degrees of forming of 10 to 45% can be attained. A value of the order of, for example, D:H=3:1 is to be regarded as a readily attainable ratio of diameter D to depth H of a container produced according to the invention, it also appearing to be possible, thanks to the attainable degree of forming to accomplish for example D:H ratios of 10:1 to 1:1 and particularly 5:1 to 2:1.

The container formed alone from the composite laminate with the layers, 12, 14 and 16 has only low intrinsic stability, which is normally not sufficient in practice. For this reason, a stabilizing plastic layer 18 may be molded onto the outside of the container 10 once it has been formed from the composite laminate 10'. This plastic layer lies in practice in a thickness range between 0.1 and 0.6 mm. For example in the case of a homopolypropylene, the molding-on temperature of the plastic must lie in a range from 240° to 260° C. in order to produce an adequately adhering bond with the plastic outer layer 16 of the preformed composite laminate container 10. The rigidity can be increased further by simultaneous or subsequent chemical or physical cross-linking of the plastic.

To reduce the layer thickness while at the same time increasing the rigidity, the polymer may be hot-stretched. The orienting thereby attained also increases the strength.

To increase the rigidity and to reduce the thickness, the molded plastic may be reinforced by particles, such as glass beads, talc, calcined chalk, chopped strands of glass or the like.

Thermoset materials and synthetic resins such as polyesters, epoxy resins, vinyl resins may also be moulded on and cured in the mould. These plastics are particularly rigid.

Finally, a thicker, foamed layer of polyethylene, polystyrene or polyurethane may be molded onto the preformed container 10. A container externally reinforced in this way is distinguished by high impact strength and stability with very low weight.

In addition, a for example foamed-on layer has a heat-insulating effect, which, if the container is used as a ready-cooked meal dish, is of advantage after heating up in a microwave oven.

Containers produced by the method described can be sterilized for example in an autoclave at a temperature of over 100° C. for several hours at, for example, two to three bar counterpressure. Optimum values are temperatures of, for example, 115°–126° C. and preferably 121° C. for 15 min to 1 hour, preferably 30 minutes.

A lid 19 of plastic can be sealed onto the plastic inner layer 12, onto the annular, fold-free edge 21 (FIG. 8 and 9) in the form of a firm closure or peelable. In this case, the choice of the plastic molded around remains largely free. For example, even recycled plastics can be used for molding around.

By sealing onto the plastic inner layer, a conceivable diffusion zone for the diffusing in of oxygen and other gases influencing the filling product is kept to a minimum.

Further typical examples of a number of composite laminates particularly suitable for the production of the container 10 are compiled below in a Table:

| Outer layer | Adhesive | Aluminum | Adhesion promoter | Inner layer |
|---|---|---|---|---|
| 15–20 μm OPP | PUR | 8–25 μm Al | PUR | 50–75 μm PP |
| 12 μm PET | " | " | or Primacor (EAA) | 50–75 μm P/PP |
| 15–20 μm oPE | " | " | or Adcote | 50–75 μm PE/PP |
| 15 μm oPA | " | " | Morprime (plus $TiO_2$) | 50–75 μm PS (plus dyes ($TiO_2$) additives) |

Finally, the present invention relates to the use of the containers according to the invention for receiving organic materials which are subject to microbial attack and in particular use of the containers for receiving foods, it being possible for the foods to be sterilized in the container.

We claim:

1. Method of producing a cup-shaped sterilizable container which comprises providing a stretch-drawable composite laminate of a total wall thickness between 30 and 200 microns, said laminate having an aluminum foil layer of a thickness less than 40 microns, a sealable plastic inner layer of high extensibility and a plastic outer layer of high extensibility and load-bearing capacity, drawing said laminate in a mold into a container with the side wall of the container running at a side wall angle (a) with respect to the direction perpendicular to the container bottom, wherein the composite material is combined deep and stretch drawn free from folds at a side wall angle (a) of essentially equal to or less than 30° using smooth-walled forming tools wherein at a side wall angle between about 15° and 30°, the combined deep drawing and stretch drawing takes place by means of a die, the composite material being deep drawn in a deep-drawing step to 30–70% of the depth (H) of the finished container and drawn in a following deep-drawing/stretch-drawing step to 75–95% of the depth (H) of the finished container and brought to the depth and width of the finished container in a stretch-drawing step following thereafter.

2. Method according to claim 1 wherein the deep drawing takes place without lubrication using a die of a material of high surface slip, mechanical stability and abrasion resistance.

3. Method according to claim 2 wherein at least the part of the die which is in contact with the composite laminate including a material selected from the group consisting of polytetrafluoroethylene (PTFE), polymethylpentene (PMP) and metal.

4. Method according to claim 1 wherein the combined deep drawing and stretch drawing takes place by means of a radially expandable die and, wherein no earlier than during the stretch-drawing step under radial expansion of the die, the composite material is brought to the depth (H) and width of the finished container.

5. Method according to claim 4 wherein the die consists of a flexible, elastomeric material which expands radially under axial compressive loading.

6. Method according to claim 1 wherein deep drawing, deep-stretch drawing and stretch drawing takes place one after the other with controlled holding-down force of a hold-down plate.

7. Method according to claim 6 wherein the deep-drawing step takes place with a holding-down force of the hold-down plate such that the material required for the deep-drawing step is drawn after out of the region of the mold and of the hold-down plate, that the deep-drawing/stretch-drawing step takes place with a holding-down force of the hold-down plate such that the material required is then only partially drawn after and simultaneously stretched and that the stretch-drawing step takes place with a holding-down force of the hold-down plate such that no material is drawn after out of the region of the mold and of the hold-down plate and that the material between mold and die is stretched.

8. Method according to claim 1 wherein deep drawing, deep-stretch drawing and stretch drawing take place without lubrication.

9. Method according to claim 6 including the steps of deep drawing at a first holding down force on said laminate, followed by a deep drawing-stretch drawing step at a second increased holding down force, followed by a stretch drawing step to final container depth at a third still further increased holding down force.

* * * * *